United States Patent [19]
Kennedy

[11] Patent Number: 4,896,913
[45] Date of Patent: Jan. 30, 1990

[54] RELEASABLE SELF LOCKING HANDLE FOR WIDE BODY, NARROW NECK CONTAINERS

[76] Inventor: Steve J. Kennedy, P.O. Box 24, Cassville, Mo. 65625

[21] Appl. No.: 270,675

[22] Filed: Nov. 14, 1988

Related U.S. Application Data

[63] Continuation-in-part of Ser. No. 246,153, Sep. 19, 1988.

[51] Int. Cl.$^4$ .................... B65D 23/10; B67B 7/44
[52] U.S. Cl. ................... 294/31.2; 81/3.09; 81/3.15; 81/3.4; 215/100 A; 220/94 R; 294/33
[58] Field of Search ............... 222/192, 465.1; 294/27.1, 28, 31.2, 33; 81/3.09, 3.07, 3.4; 7/151; 16/114 R, 110.5; 224/148; 215/100 R, 100 A, 228, 295, 302, 303; 220/85 H, 94 R, 94 A, 96, 85 D, 85 E

[56] References Cited

U.S. PATENT DOCUMENTS

| | | | |
|---|---|---|---|
| 2,568,612 | 9/1951 | Cullen | 81/3.09 X |
| 3,189,937 | 6/1965 | Sciortino | 294/33 |
| 3,353,729 | 11/1967 | Hull | 294/31.2 X |
| 3,688,936 | 9/1972 | Killigrew, Jr. | 294/33 X |
| 3,736,817 | 6/1973 | Huff | 7/151 X |
| 4,379,578 | 4/1983 | Schuler | 294/33 X |
| 4,486,043 | 12/1984 | Rais | 294/31.2 X |
| 4,509,784 | 4/1985 | Vollers | 81/3.44 X |
| 4,552,396 | 11/1985 | Rais | 294/31.2 X |
| 4,660,876 | 4/1987 | Weldin et al. | 294/33 |
| 4,666,197 | 5/1987 | Watson et al. | 294/33 X |
| 4,667,359 | 5/1987 | Polotti | 7/151 |
| 4,768,403 | 9/1988 | Bar-Noy | 81/3.15 |

FOREIGN PATENT DOCUMENTS

| | | | |
|---|---|---|---|
| 116895 | 7/1946 | Sweden | 81/3.4 |
| 614825 | 12/1948 | United Kingdom | 81/3.09 |
| 621578 | 4/1949 | United Kingdom | 81/3.09 |

Primary Examiner—Kevin P. Shaver
Attorney, Agent, or Firm—Kerkam, Stowell, Kondracki & Clarke

[57] ABSTRACT

A reusable, releasable, self-locking handle device is provided for carrying and manipulating large bottles and containers, the handle comprises a frame member having a support strap and a lock ring adapted to secure and lock a wide-body, narrow neck container, such as a large two liter bottle, and a hand grip web which allows one-handed manipulation of the large bottle. The lock ring may take the form of a flexible, resilient snap ring open at one end adapted to grip the narrow neck portion of the container or bottle. A thumb depression element allows for flexing of the ring. Also provided in the handle is a screw cap opener incorporating gripping teeth in the handle which can be used to easily and quickly break the initial seal of a sealed cap. The entire handle may be made of plastic.

4 Claims, 2 Drawing Sheets

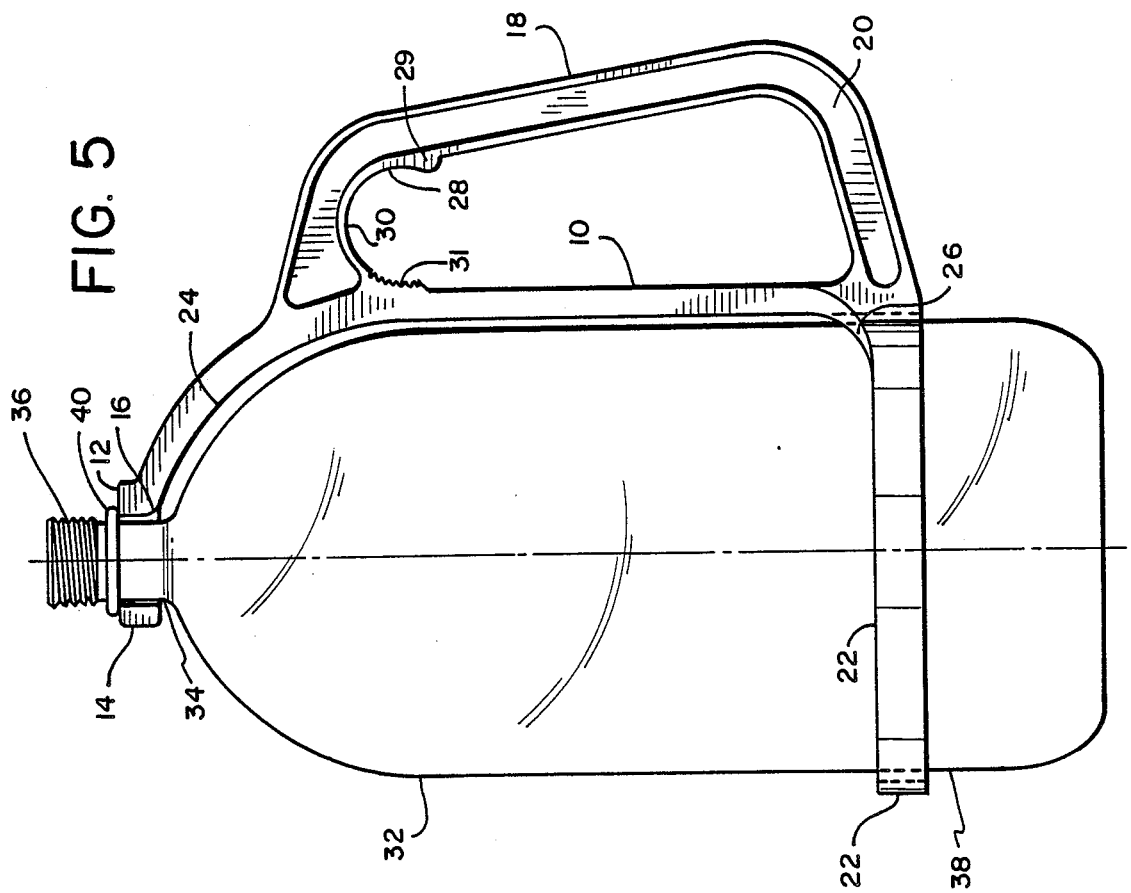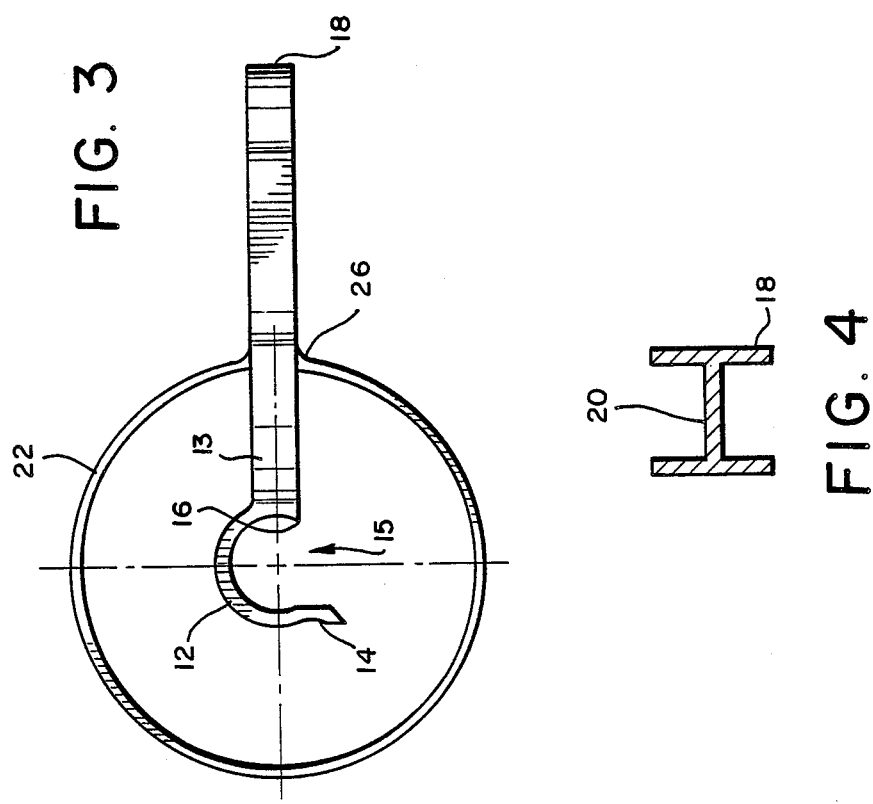

RELEASABLE SELF LOCKING HANDLE FOR WIDE BODY, NARROW NECK CONTAINERS

Related Application

This application is a continuation-in-part of U.S. Pat. Application Ser. No. 246,153, filed on Sept. 19, 1988.

BACKGROUND OF THE INVENTION

This invention relates to a handle for transporting a wide body, narrow neck container and more particularly to one-piece self-locking handle adapted to grip allowing the contents to be conveniently discharged using only one hand.

In packaging of material, there is a greater reliance on bulk containers to achieve economy in storage and transport as well to reduce the overall cost of the product to the consumer. One industry where the approach is readily apparent is the soda industry, where soda is frequently bottled in two-liter bottles. Such large bottles have come into general use, but because of their largeness, these bottles generally require the use of both hands to facilitate pouring. Even should one have a large hand and a large finger span which would enable the bottle to be gripped in one hand, such bottles frequently develop condensate as they are removed from a refrigerator or cooler, making their surface slippery and difficult to grip. Transporting of such large bottles requires the bottle to be cradled in one arm, unless one has a large grip. Even so, the handling is awkward. The difficulties in handling such bottles are increased for young children, those with nerve or muscular disorders who may suffer from loss of finger dexterity and those with arthritic disabilities of the hand.

Another disadvantage associated with large bottles becomes evident when liquid is poured from a large bottle into a glass or other small container. Because the user must use both hands to hold the bottle, he or she cannot secure the glass or other receptacle into which liquid is being poured. This can result in tipping of the receptacle and spilling of the liquid being poured. For soda, such spills are a nuisance. But should the bottle contain chemicals such as acid, strippers and the like, such spills create a hazard. Occasionally, with plastic containers, a sudden collapse of the body of the container forces a large amount of liquid to be ejected from the opening. This frequently results in spills or overturning of the receiving receptacle.

Still another problem with large container having screw on caps is that opening of the cap usually requires a large torque of force to be applied to break the plastic seal which seals the cap to the container. Once the seal is broken, opening and closing of the cap becomes easy, but the initial break of the seal requires a great amount of torque generally applied by hand. For the young, the arthritic and those who suffer from loss of finger dexterity, some mechanical aid may be necessary.

SUMMARY OF THE INVENTION

Accordingly, it is one object of the present invention to provide a handle allowing for one hand manipulation of large bottles and other wide body containers.

Another object of the invention is to provide a one piece self-locking handle for transporting wide body, narrow neck containers.

Still another object and distinct advantage of the present invention is to provide a reusable one piece self-locking handle having a bottle cap opening device, which when applied about the bottle cap will allow easy breakage of the initial seal and removal of the cap for access to the contents of the bottle.

A further object and purpose of the present invention is to provide a one piece self-locking handle for transporting a wide body, narrow neck container and to allow the contents of the container to be conveniently discharged with one hand, leaving the other hand free to hold a glass or other container into which the contents of the container are to be poured.

Another object of the present invention is to provide a reusable handle carrier which efficiently supports the weight of a bottle or a wide body container so that its weight is distributed between its neck and its lower body portion thereby minimizing the possibility of collapse of the bottle body.

In accordance with these and other objects of the invention and the attendant advantages, there is provided a reusable, releasable, self-locking handle device for carrying and manipulating large bottles and containers comprising a frame member having a support strap and a lock ring adapted to secure and lock a wide-body, narrow neck container, such as a large two liter bottle, and a hand grip web which allows one-handed manipulation of the large bottle.

The lock ring may take the form of a flexible, resilient snap ring open at one end adapted to grip a narrow neck portion of the container or bottle. A thumb depression element is provided for flexing the ring. Also provided in the handle is a screw cap opening means incorporating a gripper teeth in the handle which can be used to easily and quickly break initial the seal of a sealed screw cap. The entire handle may be made of plastic.

BRIEF DESCRIPTION OF THE DRAWINGS

The foregoing and other objects, features and advantages of the invention will be readily apparent from the following description of the preferred embodiments of the invention and the accompanying drawings and in which like reference characters refer to the same parts throughout the second views.

FIG. 3 is a top view of the present invention.

FIG. 4 is a cross section of the hand grip element of the present invention, the cross section being taken across the lines A—A of FIG. 2.

FIG. 5 is a side view of the invention as used with a bottle to illustrate the manner in which the invention is used.

DESCRIPTION OF THE PREFERRED EMBODIMENT

Figure 2:
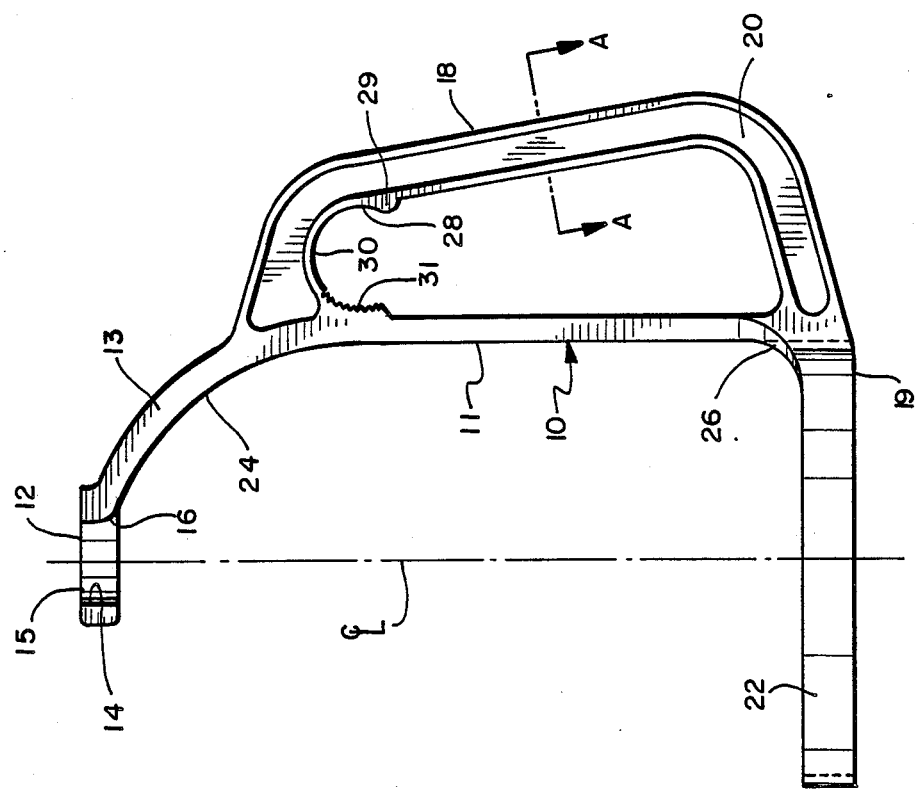
FIG. 2 is a side elevational view of the present invention.
Figure 1:
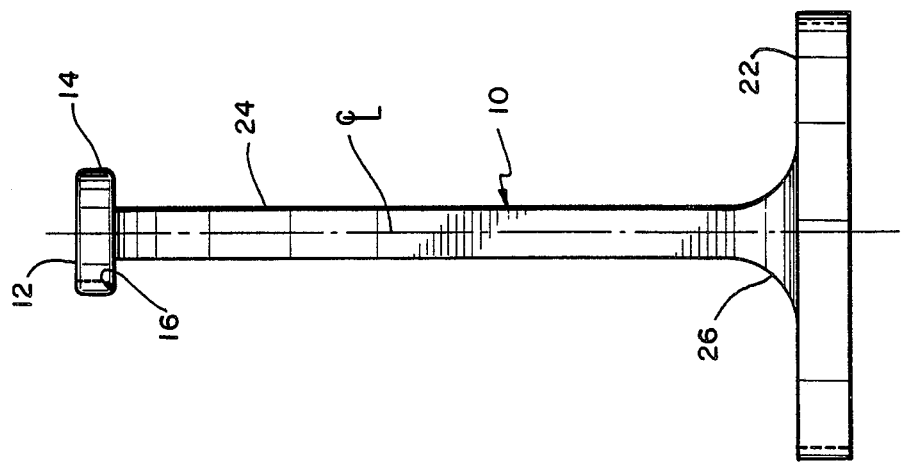
FIG. 1 is an elevational front view of the present invention.

Referring to in FIGS. 1–3, which show, respectively the front, side and top view of the invention, there is illustrated a self-locking reusable carrier handle for wide-body containers in accordance with the present invention. It should be readily apparent that the invention is particularly suited for large bottles having a substantially circular body and a narrow neck, such as, for example, a two liter soda bottle and the invention will be described in connection with application to such a bottle. However, the invention can be used with other forms of bottles or containers. Reference character 10 identifies a body frame member which preferably is molded from a plastic material and provides support to the other elements of the invention. The body frame 10 includes a main web support 13 which is conformed to the shape of wide-body container with which it is to be used for example a two-liter soda bottle as but shown in FIG. 5. Web support 13 includes a straight vertical section 11 and a curved web 13 having formed at one end thereof a flexible support ring 12 having the general shape of a C. The free end of support ring 12 includes a thumb depression or actuation element 14 which may be flexed outward to enlarge opening 15 and enable the support ring 12 to be released from a locking position about the neck of the bottle. To this end, the dimension of opening 15 is less than side diameter of the support ring 12. Ring 12 includes a radius or chamfered edge 16 to allow the support ring to fit snugly around the neck of the container to be carried by the handle.

The carrier handle further includes a grip 18 attached at one end to the body frame 10 at the juncture of the base of section 11 and a ring or support strap 22 at 19 and at the other end to the outside surface of the web 13, as best shown in FIG. 2. Grip 18 comprises a web 20 shown in cross-section in FIG. 4. Grip 18 is H-shape in cross section so as to provide added strength. Other shapes and means can be used for reinforcing the grip 18.

Referring again to FIGS. 1-3, a support strap 22 is attached at the other lower end of body frame 10. The central axis of support ring 12 as shown by line CL is common to and aligned with the axis of ring 12. Support strap 22 is preferably closed and adapted to slide over the wide body portion of a container until the strap surrounds or substantially encircles the wide portion of the body around its lower end. In this position, locking ring 12 can be snapped about the neck of the container by flexing element 14 outward and passing the neck into the opening. This can be done simply by forcing the neck of the container into the opening in sideways fashion between the ends 14 and 16, causing end 14 and 16 to flex outwardly and then inwardly about the neck as the neck enters the opening within the C ring 12. Support strap 22 together with support ring 12 when it is in position, will support the weight of the container for transport or when the bottle is tipped for pouring.

Web 13 is curved inwardly preferably to conform to the contour of the container as shown at 24 to enable the frame to fit snugly against the container. The contour 24 also provides positive positioning for the container-frame interface when the handle device is releasably attached. A bottom support contour 26 of the body frame 10 allows the handle to flex when applying or removing the locking ring 12.

To alleviate difficulty in opening sealed containers such as large bottles having screw caps, another feature of the invention provides a cap opener means 28. Opener 28 includes an enlarged abutment 29 and a smooth curved contour 30 generally matching the contour of a round bottle cap over a major portion of its length, the remaining length of cap opener means 28 being a contoured gripper tooth section 31 for gripping a bottle cap to prevent slippage between the bottle cap and the smooth surface when the bottle cap is being twisted by the handle.

The device is advantageously made of a plastic material, which can be molded or manufactured by any known plastic manufacturing process.

Use of the opener will be described in connection with an unopened bottle, such as a two-liter soda bottle, the bottle is vertically positioned, opener 28 is then brought toward the bottle cap such that the handle and the cap opener means 28 are adjacent the bottle cap in a horizontal position. The contour of the cap opener means 28, including the gripper teeth 30, are passed over the bottle cap until they substantially surround the bottle cap circumference. Further pressure exerted on the bottle cap, so as to prevent slippage by squeezing the section 11 and handle 18. Squeezing section 10 and handle 18 together forces the gripper teeth 30 to bite on the bottle cap so as to provide a secure frictional hold on the bottle cap. Twisting or turning of the handle about the bottle unscrews the bottle cap causing its seal to be broken. Once the seal is broken, the handle is no longer needed to unscrew the bottle cap since removal or placement of the bottle cap can be accomplished by manual twisting which is then easily performed.

Referring now to FIG. 5, application of the holding portion of the device to a large bottle, such as a two-liter bottle 32 is shown. The user grasps the handle device by the handle 18 and slides support strap 22 over the neck 34 of the bottle 32 and down along its body. FIG. 5 shows a representative bottle body 32 having a neck 34 and threaded portion 36 for screwable attachment of a bottle cap. Strap 22 is brought over the bottle body 32 until it rests snugly at the lower portion of the bottle, generally shown at 38 while ring 12 is held to the side of the bottle by twisting the handle sideways slightly.

Sliding of the strap 22 along the bottle body brings the support ring 12 into position for clamping of the bottle neck 34. Tilting or slight twisting of the handle 18 and body frame 10 to the side allows the lip of locking ring 12 to clear the lip of the bottle 40, located just below the threaded portion 36. When the locking ring 12 is level with the neck 34 of the bottle 32, a gentle sideways pressure is applied to the locking ring 12, so it is press-fitted around the neck of the bottle due to flexing and return of element 14. of the bottle due to flexing and return of element 14. Bringing locking ring 12 around neck 34 allows the top contour 24 and radius 16 of the ring 12 to align with the shape of the bottle structure. This gives greater stability to the total structure of the device.

It is to be noted that an advantage provided by the present invention is that only one hand is now necessary to hold the bottle and to pour from the bottle into a receptacle (not shown) once the bottle cap is removed fully. This allows the user to hold the bottle 32 with one hand by use of the handle while holding a receptacle (not shown) with the other. The user may thus secure the receptacle so it does not slide or overturn when liquid is poured into it at an angle.

When the bottle is empty or when it is desired to remove the handle, a reverse sequence is performed. While one hand grasps the handle 18, the other hand provides pressure and depresses thumb release 14 which expands the shape of the contour of locking ring 12. This expansion then allows the support ring to be removed sideways from the neck 34 of the bottle 32. A slight tilting of the handle relative to the bottle allows for slidable removal of support strap 22 over the body of bottle and the bottle neck and away from the bottle. The handle device is, of course, re-usable with other bottles as desired.

The structure of the embodiment shown has been particularized to a two-liter bottle 32, but it is understood by those skilled in the art that other handles can be customized so as to fit around other wide-body containers or large bottles. The customization process may require possible adjustment of the size and shape of the handle but such adjustment of the size and shape and dimensions of the device is within the knowledge of those skilled in the art.

While the invention has been particularly shown and described with reference to a preferred embodiment, it will be understood by those skilled in the art that various changes in form and details may be made therein without departing from the spirit and scope of the invention as defined by the appended claims.

I claim:

1. A one piece self-locking carrier handle for a wide body, narrow neck container comprising a one piece body frame member including a closed ring support strap disposed at one end of the frame member for encircling the wide body portion of a container to be carried by the carrier, releasable locking means disposed at another end of said frame member for lockingly gripping the narrow neck portion of the container, and web support means connecting said support strap and said locking means, said releasable locking means comprising a C-shaped flexible snap ring having an open section and extending from one end of the web support means, said snap ring including a flexible tip adapted to be flexed upon outward pressure to enlarge the open section and thereby permit unlocking of the ring from the neck of the container, and said web support means including a vertical support web and a hand grip web spaced therefrom and attached at opposite ends to said vertical support web and cap removing means disposed at the juncture of said hand grip web and said vertical support web, said cap removing means comprising connecting portions of inner surfaces of the hand grip web and the vertical support web and adapted to permit the cap to be opened to be gripped along a substantial portion of a peripheral surface of the cap, said inner surfaces including a toothed bearing surface, an abutment disposed diametrically opposite the toothed bearing surface and a smooth surface portion between the toothed surface and the abutment.

2. A one piece reusable carrying handle for use with large wide body, narrow neck bottles comprising:
   a frame having at least two ends;
   a closed ring support strap attached at one end of said frame and adapted to encircle and embrace the body of the wide body, narrow neck bottle;
   locking ring means attached to the other end of said frame for releasable and secure attachment to the narrow neck of the bottle; said locking ring means being substantially "C" shaped and open at one side and having a flexible tip element for enlarging the size of the open side in response to applied pressure to permit insertion and removal of the neck of the bottle from the ring;
   a carrier grip attached to said frame between said two ends and extending therefrom to allow for the manipulation and easy pouring of the contents of the bottle embraced by the strap using only one hand;
   said frame further comprising means for gripping a bottle cap adapted to seal the contents of the bottle and turning said cap to break the seal, said means for gripping including a continuous surface adapted to encircle a substantial peripheral surface of the cap to be gripped, said continuous surface including an abutment at one end, a toothed section at the other end diametrically opposite the abutment and a smooth surface between the abutment and toothed section, said continuous surface being disposed along an inner surface of the carrier grip and a portion of the adjoining surface of the frame.

3. The reusable handle as set forth in claim 2 wherein said abutment is disposed along the inner surface of the carrier grip.

4. The reusable handle as set forth in claim 3 wherein said toothed section is disposed on the portion of the adjoining surface of the frame.

* * * * *